(12) United States Patent
Schwartz et al.

(10) Patent No.: US 10,556,749 B1
(45) Date of Patent: Feb. 11, 2020

(54) CONVEYOR SYSTEM INCLUDING AN INCREMENTALLY ADJUSTABLE LIFT FRAME

(71) Applicant: PPG Industries Ohio, Inc., Cleveland, OH (US)

(72) Inventors: Brent A. Schwartz, Wapakoneta, OH (US); Kent P. Kahle, Kalida, OH (US); David J. McNamara, Lima, OH (US); Dennis J. Siefer, Findlay, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 16/237,087

(22) Filed: Dec. 31, 2018

(51) Int. Cl.
*B65G 21/12* (2006.01)
*B65G 17/12* (2006.01)
*B65G 49/04* (2006.01)
*B65G 41/00* (2006.01)
*B65G 17/20* (2006.01)

(52) U.S. Cl.
CPC .............. *B65G 21/12* (2013.01); *B65G 17/12* (2013.01); *B65G 17/20* (2013.01); *B65G 41/007* (2013.01); *B65G 49/0418* (2013.01)

(58) Field of Classification Search
CPC ........ B65G 21/10; B65G 21/12; B65G 21/14; B65G 21/22
See application file for complete search history.

(56) References Cited

U.S. PATENT DOCUMENTS

| | | |
|---|---|---|
| 468,057 A | 2/1892 | Mullen |
| 1,073,803 A | 9/1913 | Gotuzzo |
| 2,604,970 A | 7/1952 | Steinhoff |
| 2,975,882 A | 3/1961 | Abbey |
| 3,317,023 A | 5/1967 | Ryerson et al. |
| 3,343,650 A | 9/1967 | Brown |
| 3,412,373 A | 11/1968 | Ellis |
| 3,658,197 A | 4/1972 | DiDonato |
| 3,684,080 A | 8/1972 | Nest |
| 3,707,218 A | 12/1972 | Payne et al. |
| 4,144,965 A | 3/1979 | Alldredge et al. |
| 4,252,229 A | 2/1981 | Corbett |
| 4,268,206 A | 5/1981 | Johnson |
| 4,730,716 A | 3/1988 | Enneking et al. |
| 5,043,052 A | 8/1991 | Sakai |
| 5,058,730 A | 10/1991 | Opperthauser |
| 5,101,734 A | 4/1992 | Sakai |

(Continued)

*Primary Examiner* — William R Harp
(74) *Attorney, Agent, or Firm* — Christopher I. Meyer; Dinsmore & Shohl LLP (57) ABSTRACT

A conveyor system is disclosed and includes a plurality of conveyor sections, a lift assembly, and a telescoping joint. The conveyor sections define a conveying path extending from an upstream conveyor section to a downstream conveyor section with a translatable section disposed therebetween. Further, the translatable section includes a declined section, an inclined section, and an intermediate section. The lift assembly is operationally connected to the translatable section and includes a fully lifted position, a fully lowered position, and a plurality of intermediate positions therebetween. The telescoping joint is operationally connected to and positioned between two of the conveyor sections of the translatable section and is configured to contract in a linear direction as the lift assembly is actuated toward the fully raised position and is configured to expand in the linear direction as the lift assembly is actuated towards the fully lowered position.

18 Claims, 10 Drawing Sheets

(56) References Cited

U.S. PATENT DOCUMENTS

| | | |
|---|---|---|
| 5,163,545 A | 11/1992 | David |
| 5,568,857 A | 10/1996 | Chen et al. |
| 5,620,080 A | 4/1997 | Kassuba |
| 6,223,890 B1 | 5/2001 | Blankemeyer et al. |

CONVEYOR SYSTEM INCLUDING AN INCREMENTALLY ADJUSTABLE LIFT FRAME

FIELD

The present disclosure relates to conveyor systems and methods of operating a conveyor system and, more particularly, to a conveyor system that includes a lift frame that incrementally raises and lowers a portion of the conveyor system.

BACKGROUND

Article processing systems commonly employ an elevator/conveyor system that moves articles to be treated or processed along a series of work stations. The work stations are traditionally positioned along a conveyor path. The articles may be successively moved from a loading/unloading station and through a series of work stations. The articles may then be returned to the loading/unloading station. An elevator mechanism may be used to raise and lower the articles to and from selected work stations (e.g., processing tanks) along the treatment path. More specifically, the articles may be lowered into a processing tank. The entire article may be treated while submerged in the processing tank. Once treatment is complete, the elevator mechanism may then lift and remove the articles from the processing tank.

In at least some instances, only a portion of the article may receive treatment or the extent of desired treatment may vary between part types or styles. That is, in other words, only a portion of the article may need to be submerged within one of the processing tanks and the desired level of submersion may change from one article type or style to a second article type or style.

It would therefore be desirable to provide a system that enables articles to be treated in a flexible manner according to the varying individual needs.

BRIEF SUMMARY

In accordance with the present disclosure, a conveyor system is provided which includes a plurality of conveyor sections, a lift assembly, and a telescoping joint. The plurality of conveyor sections define a conveying path extending from an upstream conveyor section to a downstream conveyor section with a translatable section disposed therebetween. The translatable section includes a declined section, an inclined section, and an intermediate section between the inclined section and the declined section. The lift assembly is operationally connected to the translatable section with the lift assembly including a fully lifted position, a fully lowered position, and a plurality of intermediate positions between the fully lifted position and the fully lowered position. The telescoping joint is operationally connected to and positioned between two of the conveyor sections of the translatable section. The telescoping joint is configured to contract in a linear direction as the lift assembly is actuated toward the fully raised position and is configured to expand in the linear direction as the lift assembly is actuated towards the fully lowered position.

The conveyor system of the present invention as described above and in more detail subsequently below may be configured to incrementally lift and lower articles attached to a conveying path into a product treatment bath. The conveyor system allows for real-time adjustment of the level of submersion based on article type or style.

BRIEF DESCRIPTION OF THE DRAWINGS

The following detailed description of specific exemplary embodiments of the present disclosure can be best understood when read in conjunction with the following drawings, where like structure is indicated with like reference numerals.

DETAILED DESCRIPTION

Figure 1:
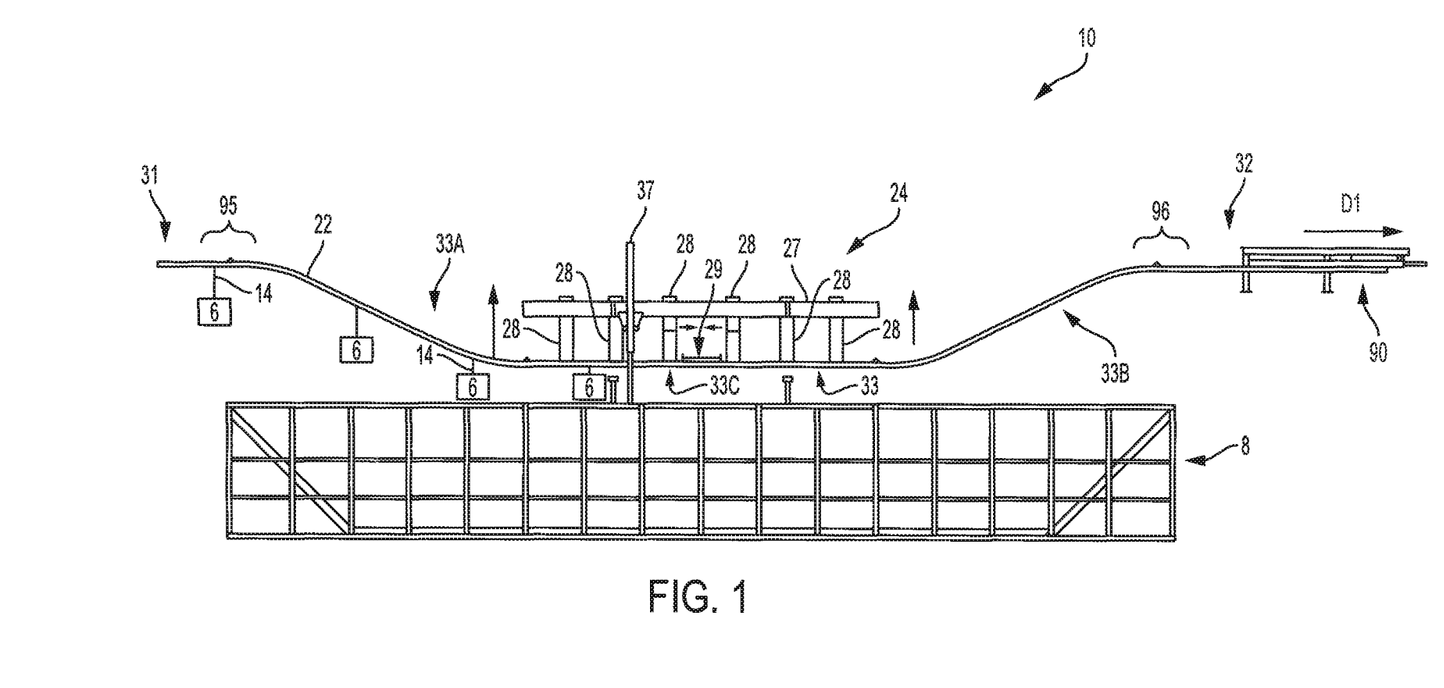
FIG. 1 is an illustration of an exemplary conveyor system according to one or more embodiments of the present disclosure, where the conveyor system is in a raised position.
Figure 2:
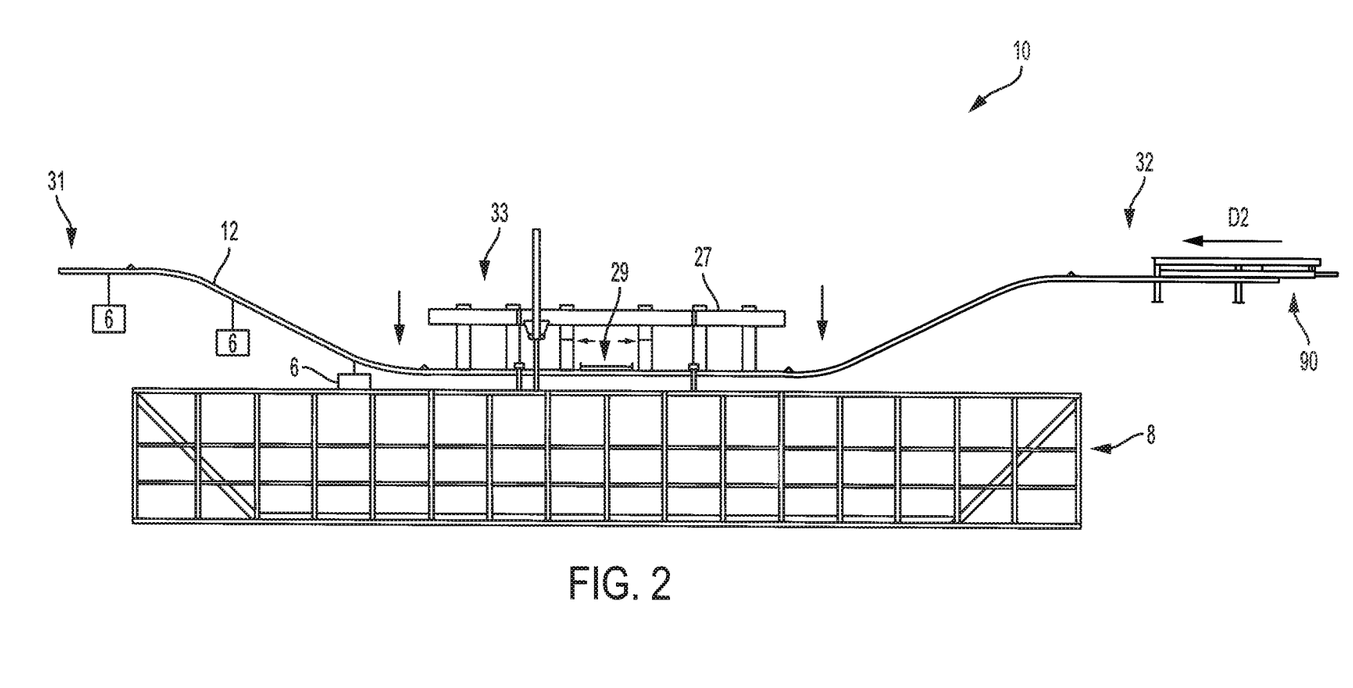
FIG. 2 is an illustration of an exemplary conveyor system according to one or more embodiments of the present disclosure, where the conveyor system is in a lowered position.

Referring to FIGS. 1 and 2, the conveyor system 10 according to the present disclosure includes a plurality of conveyor sections 12 defining a conveying path 22 extending from an upstream conveyor section 31 to a downstream conveyor section 32 with a translatable section 33 disposed therebetween. The translatable section 33 includes a declined section 33A, an inclined section 33B, and an intermediate section 33C between the inclined section 33B and the declined section 33A. The relative terms "inclined"

and "declined" are provided relative to the direction of travel. The conveyor system 10 further includes a telescoping joint 29 and a lift assembly 24 operationally connected to the translatable section 33. The telescoping joint 29 is operationally connected to and positioned between two of the conveyor sections 12 of the translatable section 33 and is configured to contract in a linear direction as the lift assembly 24 is actuated toward a fully raised positioned and is configured to expand in the linear direction as the lift assembly 24 is actuated toward a fully lowered position. The conveyor system 10 according to the present disclosure may also include a plurality of treatment baths 8, a plurality of load bearing assemblies 14, and a conveyor linkage assembly 16. The load bearing assemblies 14 may each be coupled to an article 6; however it should be appreciated that the load bearing assemblies 14 are not shown in detail in FIG. 1 for purposes of clarity and simplicity. The articles 6 may be moved successively from one product treatment bath 8 to another product treatment bath 8 through advancement of the conveyor linkage assembly 16.

The conveyor sections 12 define the upstream conveyor section 31, the downstream conveyor section 32, and the translatable section 33. The translatable section 33 provides the declined section 33A, the intermediate section 33C, and the inclined section 33B. It should be appreciated that the intermediate section 33C of the conveyor system 10 includes two or more of the conveyor sections 12 with the telescoping joint 29 connecting sequential sections. The telescoping joint 29 allows for adjustment of the overall length of the translatable section 33. Moreover, the declined section 33A of the conveyor system 10 may be a mirror image of the inclined section 33B. The inclined section 33B of the conveyor sections 12 may be used to position the articles 6 away from or above the product treatment baths 8. Similarly, the declined section 33A of the conveyor sections 12 may be used to position the articles 6 toward or into the product treatment baths 8.

The lift assembly 24 may be configured to incrementally raise and lower a portion of the conveyor sections 12, generally translatable section 33, of the conveyor system 10. Accordingly, the articles 6 may be partially or completely submerged within a product treatment bath 8 as the conveyor sections 12 are incrementally raised or lowered. Flexibility in the extent of article 6 submersion in the product treatment bath 8 allows for a reduction in the typical requirement to mask off a section of article 6 not requiring the treatment contained therein. According to the present invention, the entire article 6 may also be located outside of the product treatment baths 8, thereby bypassing the treatment contained therein. The lift assembly 24 also may be configured to account for the lengthening and shortening of the length of the conveying path 22 while raising or lowering the conveyor sections 12. In other words, the length of the conveying path 22 to traverse the product treatment baths 8 may increase or lengthen as the lift assembly 24 is lowered towards the product treatment baths 8. Similarly, the length of the conveying path 22 to traverse the product treatment baths 8 may decrease or shorten as the lift assembly 24 is raised away from the product treatment baths 8. The conveyor system 10 allows for a continuous running monorail style conveyor system wherein the conveyor linkage assembly 16 and attached articles 6 may be moved in a continuous manner.

With reference to FIGS. 1, 2, 5, and 6, the lift assembly 24 may include a lift frame 27 and a plurality of translatable support members 28. The translatable support members 28 may be statically affixed to the translatable section 33 of the conveyor sections 12 and movably affixed to the lift frame 27 such that the translatable support members 28 may move in coordination with individual conveyor sections of the translatable section 33 upon operation of the telescoping joint 29. The translatable support members 28 may be movably affixed to the lift frame 27 with a series of retention wheels 56 positioned on opposing sides of support beams 58. Specifically, the support beams 58 may be affixed to the lift frame 27 and the retention wheels 56 may be rotatable affixed to the translatable support members 28 in an orientation to retain the translatable support members 28 on the support beams 58. Retention of the translatable support members 28 on the support beams 58 may be achieved by placing a retention wheel 56 on a first side of the support beams 58 and a retention wheel 56 on a second side of the support beams 58 opposite the first side. The retention wheels 56 may comprise a grooved geometry on their rolling surface configured and sized to match the outer geometry of the support beams 58. A longitudinal axis of the support beams 58 may be parallel to a longitudinal axis of the translatable section 33 of the conveyor sections 12 statically affixed to the translatable support members 28 to allow for translation of the translatable support members 28 along the support beams 58 in coordination with expansion and contraction of the telescoping joint 29.

In accordance with the present invention, the plurality of translatable support members 28 may be positioned such that a portion of the translatable support members 28 may be affixed to the translatable section 33 on each side of the telescoping joint 29. Further, the lift frame 27 may be positioned parallel to one or more of the upstream conveyor section 31, the downstream conveyor section 32, or the intermediate section 33C of the conveyor system 10.

The lift assembly 24 includes a fully raised position, a fully lowered position, and a plurality of intermediate positions between the fully raised and lowered positions. The lift assembly 24 is illustrated in a raised position in FIG. 1 where the articles 6 are suspended over the product treatment baths 8. It will be appreciated that according to the present invention, the articles 6 may also be partially submerged when the lift assembly 24 is in the fully raised position depending on the desired arrangement and intended use of the conveyor system 10. Specifically, the conveyor system 10 may be configured to transition from partially submerged to full submersion or may transition from fully non-submerged to full submersion. FIG. 2 illustrates the lift assembly 24 in the fully lowered position, where the articles 6 may be completely submerged within the product treatment baths 8. The lift assembly 24 may be incrementally raised and lowered between the fully raised position and the fully lowered position. As the lift assembly 24 is incrementally raised, the level of submersion of the articles 6 in the treatment bath 8 may decrease. Similarly, as the lift assembly 24 is lowered, the level of submersion of the articles 6 in the treatment bath 8 may increase. The level or degree of submersion of the articles 6 within the treatment bath 8 may be based on characteristics such as, but not limited to, the size of the articles 6, the shape of the articles 6, and the like.

The telescoping joint 29 may be positioned between two of the conveyor sections 12 located in the translatable section 33 of the conveyor system 10, and the lift frame 27 may be positioned in a location above the telescoping joint 29. A lift 37 may be used to actuate the lift frame 27 in a vertical direction between the raised position shown in FIG. 1, the lowered position shown in FIG. 2, and the plurality of immediate positions. Thus, as the lift assembly 24 incrementally travels in the vertical direction into the lowered position the amount of submersion of the articles 6 within one of the product treatment baths 8 increases. The lift 37 may comprise a stepper motor, a linear actuator, chain lift assembly, air cylinders, hydraulic cylinders or other positioning system known to those skilled in the art.

In one or more embodiments, the lift 37 comprises a ball screw mechanism to provide fine adjustment of the vertical travel of the lift assembly 24. The ball screw mechanism allows for correction of the levelness of the intermediate section 33C upon adjustment of the lift assembly 24.

The lift frame 27 may be operationally connected to the telescoping joint 29. It should be appreciated that the telescoping joint 29 allows for linear expansion and contraction so as to either increase or decrease the overall length of the conveyor sections 12. More specifically, the telescoping joint 29 may be configured to contract as the lift frame 27 is actuated into the raised position as seen in FIG. 1, thereby decreasing the overall length of the conveyor sections 12. Similarly, the telescoping joint 29 may be configured to expand as the lift frame 27 is actuated towards the lowered position as seen in FIG. 2, thereby increasing the overall length of the conveyor sections 12.

Referring now to FIGS. 1, 2, 7A, 7B, 8A, and 8B, the telescoping joint 29 may be defined by two of the conveyor sections 12 of the translatable section 33 that are connected to one another by a slip joint 92. In accordance with the present disclosure, the intermediate section 33C of the translatable section 33 may include two or more conveyor sections with the telescoping joint 29 disposed between two of the two or more conveyor sections 12 of the intermediate section 33C. Such arrangement is illustrated in FIGS. 1, 2, 7A, 7B, 8A, and 8B. In such arrangement, the plurality of translatable support members 28 are affixed to the intermediate section 33C of the conveyor system 10.

In accordance with the present invention, the translatable section 33 may further include a lead-in section 95 in substantial alignment with the upstream conveyor section 31, a lead-out section 96 in substantial alignment with the downstream conveyor section 32, or both the lead-in section 95 and the lead-out section 96. The term "substantial alignment" means that the two sections are joined such the load bearing assemblies 14 are capable of transitioning from one section to the next section. As such, the lead-in section 95 connects the upstream conveyor section 31 and the declined section 33A. Similarly, the lead-out section 96 connects the downstream conveyor section 32 and the inclined section 33B. To allow relative movement of the translatable section 33 and the upstream conveyor section 31 and downstream conveyor section 32 respectively, one or more of the lead-in section 95 and the lead-out section 96 comprises two or more subsections with the telescoping joint 29 located between the subsections. It is envisioned that the lead-in section 95 and the lead-out section 96 may be contiguous with the upstream conveyor section 31 and the downstream conveyor section 32 respectively. Further, the lead-in section 95 and the lead-out section 96 may be integral with the upstream conveyor section 31 and the downstream conveyor section 32 respectively or may be provided as separate conveyor sections 12. In such arrangement, the plurality of translatable support members 28 may be affixed to the lead-in section 95 or divided between both the upstream conveyor section 31 and lead-in section 95. Similarly, the plurality of translatable support members 28 may be affixed to the lead-out section 96 or divided between both the downstream conveyor section 32 and lead-out section 96.

Figure 7A:
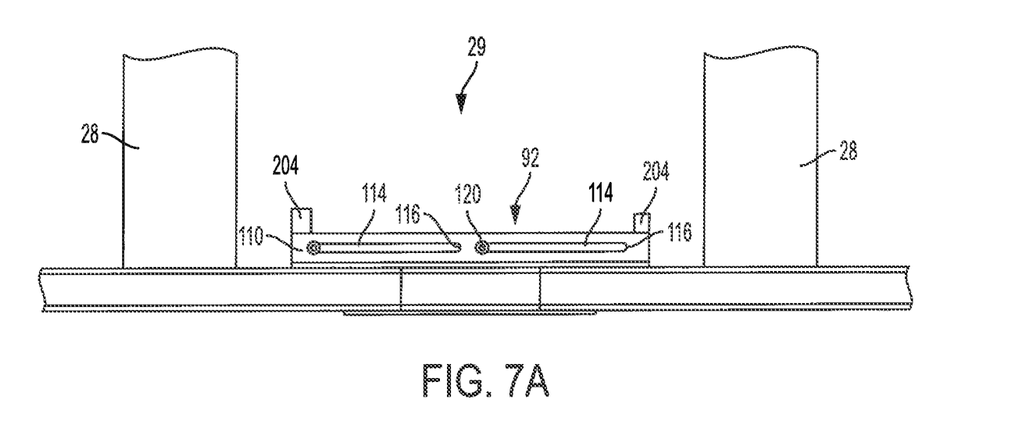
FIG. 7A is a side view of a slip joint of the conveyor system shown in FIG. 1 in a contracted position according to one or more embodiments of the present disclosure.
Figure 7B:
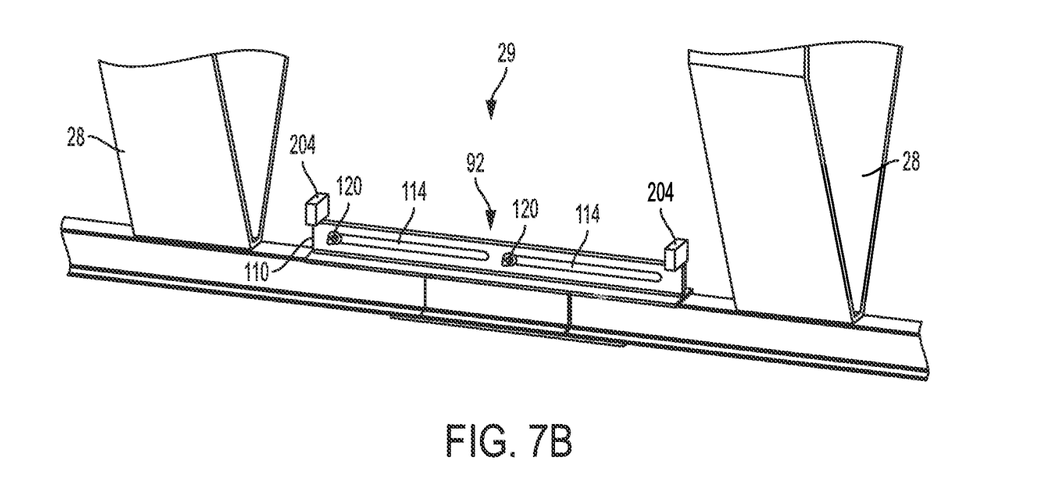
FIG. 7B is an isometric view of the slip joint shown in FIG. 7A according to one or more embodiments of the present disclosure.

It should be appreciated that when the lift assembly 24 is in the fully raised position, the length of the conveying path 22 to traverse the product treatment bath 8 decreases. Referring now to FIGS. 7A and 7B, the slip joint 92 is in a first, contracted position in order to compensate for the decreased length of the conveying path 22 and the overall length of the conveying path 22 as illustrated in FIG. 1.

Figure 8A:
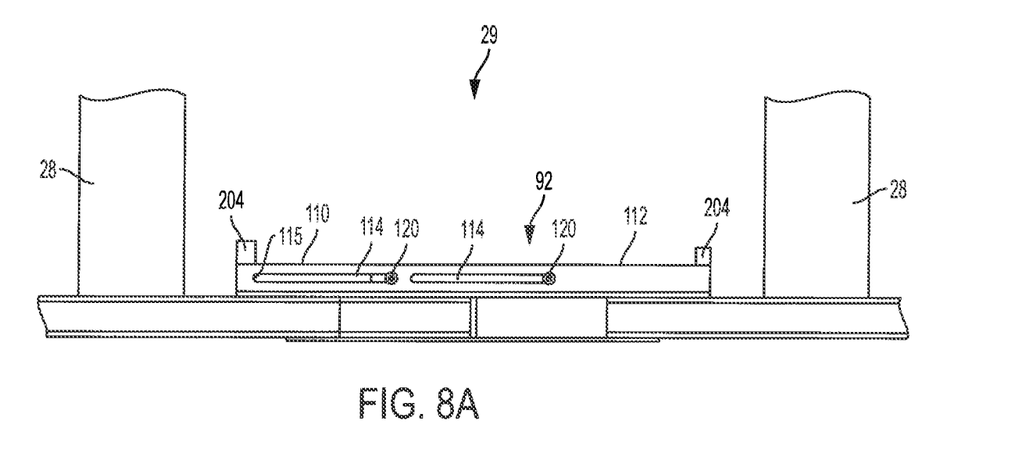
FIG. 8A is a side view of a slip joint of the conveyor system shown in FIG. 1 in an expanded position according to one or more embodiments of the present disclosure.
Figure 8B:
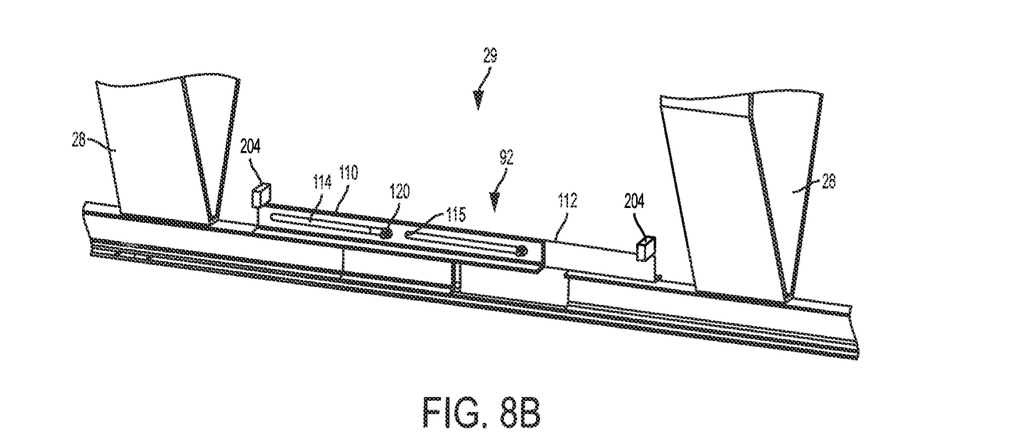
FIG. 8B is an isometric view of the slip joint shown in FIG. 8A according to one or more embodiments of the present disclosure.

It should also be appreciated that length of the conveying path 22 to traverse the product treatment bath 8 increases as the lift assembly 24 is lowered toward the product treatment bath 8. Turning now to FIGS. 8A and 8B, the slip joint 92 is shown in a second, expanded position when the lift assembly 24 is in the fully lowered position in order to compensate for the increased length of the conveying path 22. More specifically, the slip joint 92 may be expanded so as to increase the overall length of the conveyor sections 12.

Referring to FIGS. 1, 2, 7A, 7B, 8A and 8B, the slip joint 92 includes an external member 110 and a telescoping member 112. According to the present invention, the external member 110 may define a plurality of longitudinally oriented slots 114. Each slot 114 includes a first end surface 115 and a second end surface 116, where the end surfaces 115, 116 are defined as the ends of the slots 114. A pin or other elongated member 120 may be received by a corresponding one of the slots 114. The elongated members 120 may each include a cross-sectional profile that is shaped to fit within and translate along a respective one of the slots 114. Both of the elongated members 120 may be attached or connected to the telescoping member 112 of the slip joint 92.

As seen in FIGS. 7A, 7B, 8A and 8B, the telescoping member 112 may be received by the external member 110, where the telescoping member 112 may be configured to translate in the linear direction with respect to the external member 110. More specifically, when the slip joint 92 is in the contracted position and the lift assembly 24 is in the fully raised position the telescoping member 112 is completely located within the external member 110. As may also be seen in FIGS. 7A and 7B, the two elongated members 120 may each abut against the end surfaces 116 of their respective slots 114.

As the slip joint 92 expands, the telescoping member 112 may translate in the linear direction such that a portion of the telescoping member 112 may be located outside of the external member 110. The elongated members 120 may also translate within their respective slots 114 until the elongated members 120 abut against the other end surface 116 defined by their respective slots 114 as seen in FIGS. 8A and 8B. When in the position as seen in FIGS. 8A and 8B, the slip joint 92 is fully expanded and the lift assembly 24 is in the fully lowered position. It should be appreciated that the illustrations shown in the figures are merely one example of a slip joint, and that other types and configurations of slip joints that allow for linear motion may be used as well.

It should be appreciated that while two slots 114 and two elongated members 120 are shown, any number of slots 114 and corresponding elongated members 120 may be used. More specifically, it should be appreciated that the external member 110 may also define at least one slot 114, and at least one elongated member 120 may be connected to the telescoping member 112 and the elongated member 120 may be shaped to translate within the slot 114 of the external member 110.

The external member 110 and the telescoping member 112 may be integrally formed as part of two of the conveyor sections 12 of the translatable section 33. Specifically, a first conveyor section of the translatable section 33 may be integrally formed with the external member 110 and a second conveyor section, adjacent the first conveyor section, of the translatable section 33 may be integrally formed with the telescoping member 112. It will further be appreciated that in accordance with the present disclosure the external member 110 and the telescoping member 112 may be removably affixed to two adjacent conveyor sections of the translatable section 33 to connect said conveyor sections 12.

Figure 3:
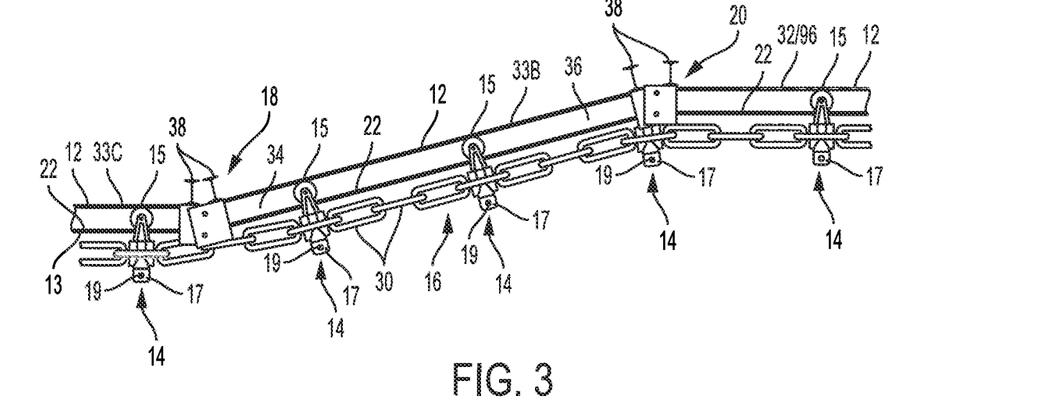
FIG. 3 is an illustration of linkage and load bearing assemblies, which may be used in the conveyor system according to one or more embodiments of the present disclosure.
Figure 4:
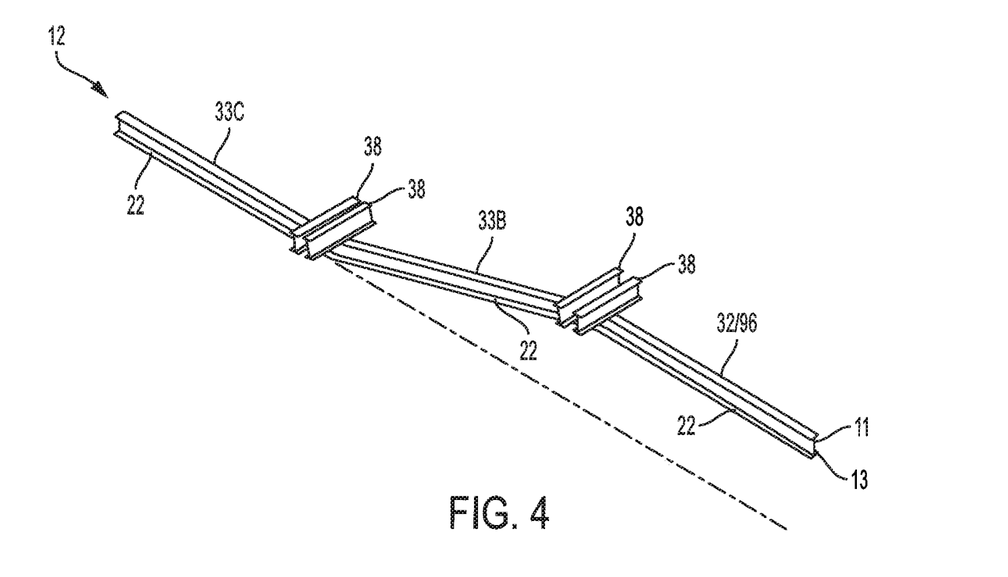
FIG. 4 is an isometric view of FIG. 3 where the linkage and load bearing assemblies are omitted according to one or more embodiments of the present disclosure.

Operation of the conveyor linkage assembly 16 shall now be described with reference to FIGS. 3 and 4, which illustrate the inclined section 33B of the conveyor system 10 shown in FIG. 1 in further detail. FIG. 3 is an illustration of the inclined section 33B of the conveyor system 10 including the related conveyor linkage assembly 16. FIG. 4 is an isometric view of the inclined section 33B in FIG. 3, where the conveyor linkage assembly 16 is omitted. It will be appreciated that while FIGS. 3 and 4 illustrate the inclined section 33B of the conveyor system 10, the declined section 33A of the conveyor system 10 would represent a mirror image thereof.

The conveyor linkage assembly 16 may be defined by a series of chain links 30 that are arranged to couple the load bearing assemblies 14 to each other along the conveying path 22. The load bearing assemblies 14 may be secured to the conveyor sections 12 such that the load bearing assemblies 14 are free to move along the conveying path 22. Thus, the conveyor linkage assembly 16 may be coupled to the conveyor sections 12 by the load bearing assemblies 14.

According to the present invention, as illustrated in FIGS. 3 and 4, the conveyor sections 12 may comprise I-beams. In other words, they define respective I-shaped cross sections. The movable load bearing assemblies 14 may comprise respective hangers 17 supported by a lower portion 13 of the I-beam cross section via a pair of wheels 15 secured to respective ones of the hangers 17. The pair of wheels 15 may be positioned on opposite sides of a central longitudinal portion 11 of the I-shaped cross section (see FIGS. 3 and 4). To preserve clarity of illustration, only one wheel 15 of each respective pair is shown in FIG. 3. As would be appreciated by those practicing the present invention, the structure of each wheel not shown in the figures may be substantially identical to those illustrated, with the exception that the wheels not illustrated may be positioned so as to be supported by the lower portion 13 of the I-beam on the opposite side of the central longitudinal portion 11.

The hangers 17 of the load bearing assemblies 14 are each configured to couple to an article 6 as illustrated in FIG. 1. For example, according to the present invention the hangers 17 may each define an opening 19 shaped to receive a hook-shaped support (not shown), where the hook-shaped support may be used to couple a respective load bearing assembly 14 to a respective article 6. However, it should be appreciated that other approaches may be used to couple the load bearing assemblies 14 to the articles 6 as well.

The conveyor linkage assembly 16 may be configured to couple the movable load bearing assemblies 14 for collective movement along the conveying path 22 of the conveyor sections 12. The chain links 30 of the conveyor linkage assembly 16 couple the load bearing assemblies 14 to each other along the conveying path 22. It should be appreciated that the chain links 30 may be configured to incorporate backlash relative to one another to allow for inclination and declination of the respective conveyor sections 12. Commercial examples of linkage assemblies that may be utilized are available from Frost Incorporated of Grand Rapids, Mich.

Figure 9:
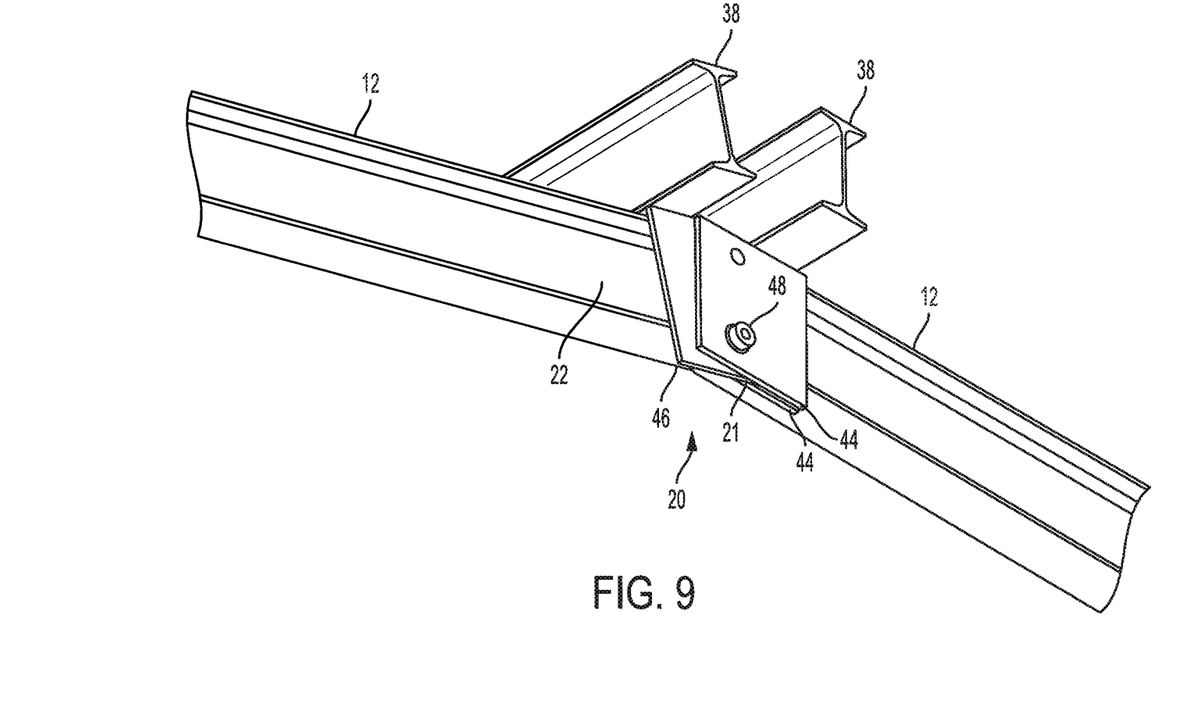
FIG. 9 is an enlarged view of a hinge assembly shown amongst others in FIG. 3 according to one or more embodiments of the present disclosure.

Referring to FIGS. 3 and 9, versions of a first hinge assembly 18 and a second hinge assembly 20 are provided. Each hinge subassembly 18, 20 includes a pair of outer hinge plates 44 coupled to one of the conveyor sections 12 by a crossing beam 38 and an inner hinge plate 46 coupled to an adjacent conveyor sections 12 by another crossing beam 38. Although FIG. 9 illustrates the crossing beams 38 as I-beams, it is to be appreciated that other structural support members may be used as well. As seen in FIG. 9, the inner hinge plate 46 may be positioned between the pair of outer hinge plates 44. The inner hinge plate 46 may be free to rotate about a hinge pivot 48 relative to the outer hinge plates 44. The conveyor sections 12 may rotate with respect to one another about the hinge assemblies 18, 20 to assume respective inclined or declined orientations relative to each other. Although FIG. 9 illustrates the second hinge assembly 20, it should be appreciated that the first hinge assembly 18 includes a similar structure.

Figure 5:
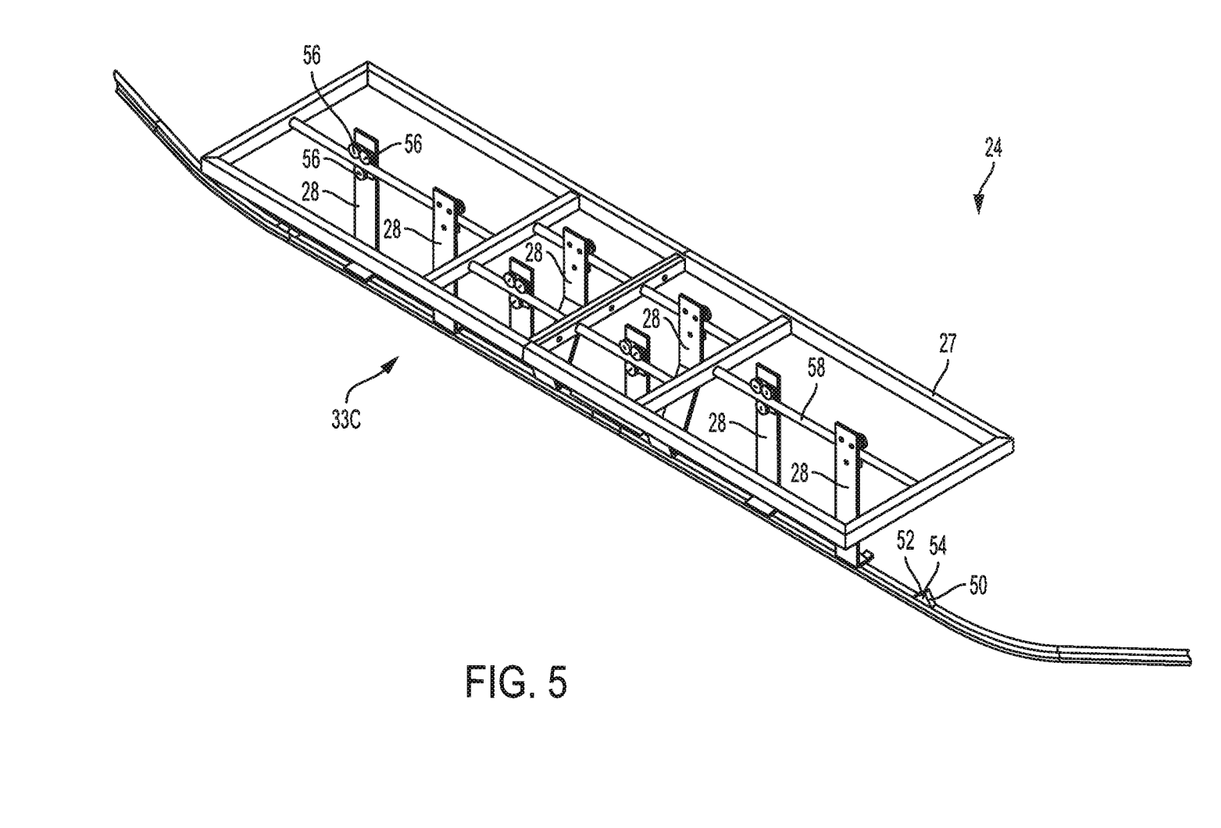
FIG. 5 is an isometric view of an exemplary lift assembly, which may be used in the conveyor system according to one or more embodiments of the present disclosure.
Figure 6:
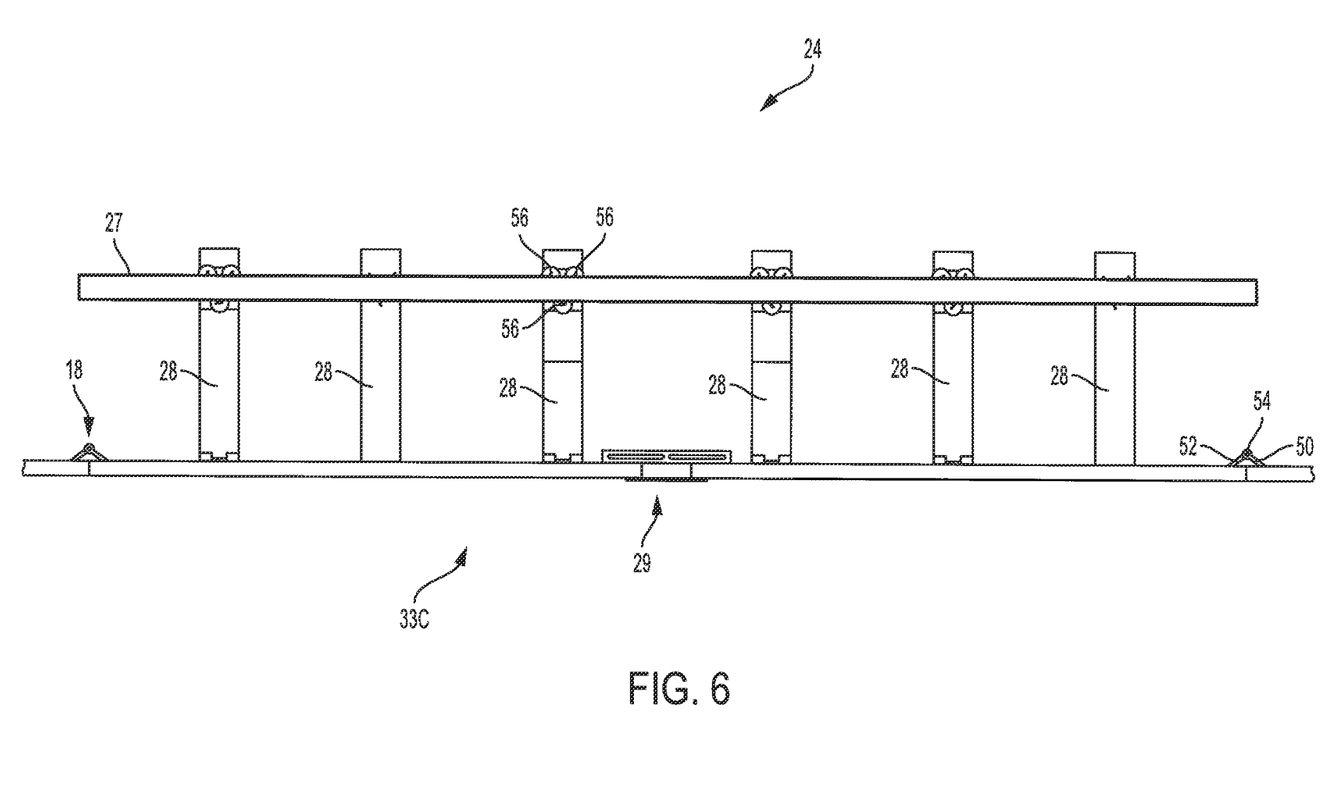
FIG. 6 is a further illustration of a lift assembly, which may be used in the conveyor system according to one or more embodiments of the present disclosure.

Referring to FIGS. 5 and 6, alternative versions of the first hinge assembly 18 and the second hinge assembly 20 are provided. Each hinge subassembly 18, 20 includes an inner hinge plate 50, and outer hinge plate 52, and a pivot pin 54, The inner hinge plate 50 may be affixed to one of the conveyor sections 12 and the outer hinge plate 52 may be affixed to an adjacent conveyor section 12. The inner hinge plate 50 and the outer hinge plate 52 may be connected with the pivot pin 54 restricting movement of the inner hinge plate 50 and the outer hinge plate 52 to movement about an axis of rotation along a longitudinal axis of the pivot pin 54.

Referring to FIG. 3, according to the present invention the first hinge assembly 18 may be configured to couple a first end 34 of the inclined section 33B to the intermediate section 33C. The first hinge assembly 18 may also be configured to allow the inclined section 33B to incline or decline relative to the intermediate section 33C. The second hinge assembly 20 may be configured to couple a second end 36 of the inclined section 33B to the lead-out section 96 or downstream conveyor section 32. The second hinge assembly 20 may also be configured to allow the inclined section 33B to incline or decline relative to the lead-out section 96 or downstream conveyor section 32. While not illustrated for conciseness, another of the first hinge assembly 18 may also be present to connect the lead-in section 95 or upstream conveyor section 31 to the declined section 33A in a configuration to allow the declined section 33A to incline or decline relative to the lead-in section 95 or upstream conveyor section 31. Similarly, another of the second hinge assembly 20 may be present to connect the declined section 33A to the intermediate section 33C in a configuration to allow the declined section 33A to incline or decline relative to the intermediate section 33C. Accordingly, the conveyor sections 12 may move between the raised and lowered orientations illustrated in FIGS. 1 and 2 respectively.

Figure 10:
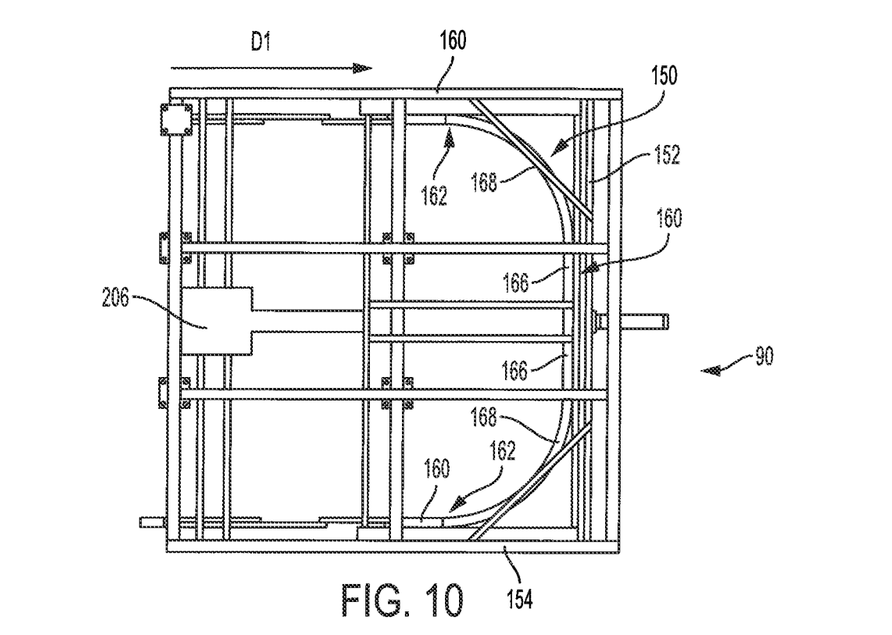
FIG. 10 is an illustration of a take-up assembly that is part of the conveyor system shown in FIG. 1 in a fully extended position according to one or more embodiments of the present disclosure.

FIG. 10 is an illustration of an exemplary take-up assembly 90 that may be part of the conveyor system 10. As seen in FIG. 1 the take-up assembly 90 may be positioned downstream of the lift assembly 24, and more specifically downstream of the declined section 33A, the intermediate section 33C, and the inclined section 33B in the downstream section 32. The take-up assembly 90 may also be positioned upstream of the lift assembly 24 in the upstream conveyor section 31. In accordance with the present invention, the conveyor system 10 may include multiple take-up assemblies 90. Specifically, a take-up assembly 90 may be positioned before and/or after each of the product treatment baths 8, before and/or after alternating product treatment baths 8, or other combinations throughout the conveyor system 10. It is to be appreciated that a take-up assembly 90 may be used to ensure adequate tension of the chain on a conveyor as well as to compensate for changes in the length of the conveyor linkage assembly 16.

Referring to FIGS. 1 and 10, the take-up assembly 90 is in a fully extended position when the lift assembly 24 is in the fully raised position. That is, the take-up assembly 90 may be urged or translated in a first direction D1 away from the lift assembly 24. Translating the take-up assembly 90 in the first direction D1 compensates for the linear retraction of the conveying path 22 over the product treatment bath 8 when the lift assembly 24 is in the fully raised position.

Figure 11:
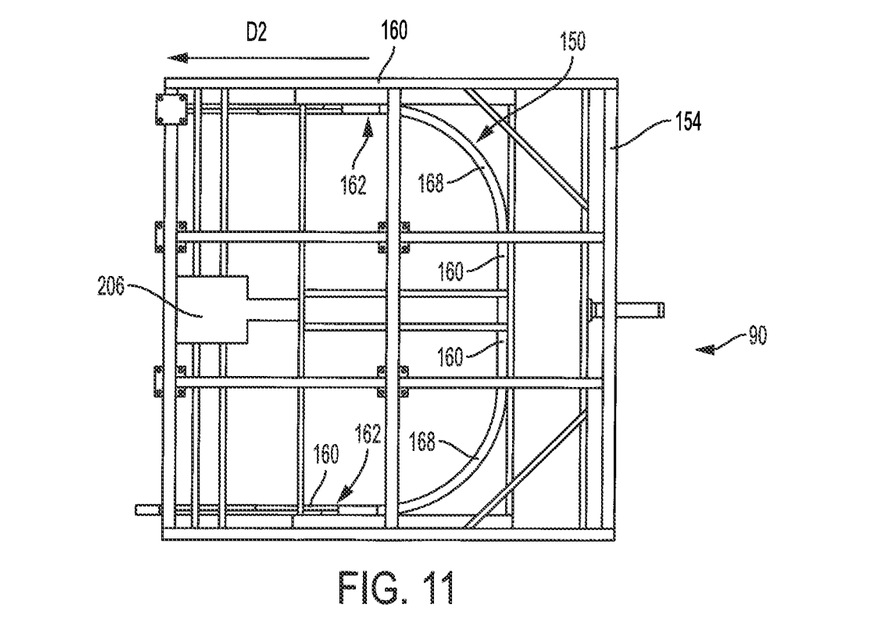
FIG. 11 is an illustration of the take-up assembly shown in FIG. 10 in a fully retracted position according to one or more embodiments of the present disclosure.

Turning now to FIGS. 2 and 11, the take-up assembly 90 is in a retracted position in order to also compensate for the increased length of the conveying path 22 when the lift assembly 24 is in the fully lowered position. The take-up assembly 90 is urged or translated in a second direction D2 towards the lift assembly 24. Translating the take-up assembly 90 in the second direction D2 compensates for the linear expansion of the conveying path 22 when the lift assembly 24 is in the fully lowered position.

With reference to both FIGS. 10 and 11, according to the present invention the take-up assembly 90 may include a curved track portion 150, a cross-member 152, and a frame 154. The curved track portion 150 may include two, substantially straight side frame members 160 that are parallel with respect to one another. A curved member 164 extends in a transverse direction between the ends 162 of both the side frame members 160, and may be defined by of two J-shaped arms. More specifically, each J-shaped arm includes a straight leg segment 166 and a curved segment 168. The J-shaped arms connect to one another to create a generally U-shaped profile. A U-shaped profile includes two substantially parallel sides that are each connected to one another by an arcuate section.

The cross-member 152 extends transversely with respect to the two side frame members 160. The curved track portion 150 and the cross-member 152 may translate back and forth between the first and second directions D1 and D2 (seen in FIG. 1) with respect to the frame 154, which remains stationary. More specifically, the curved track portion 150 and the cross-member 152 may translate in the first direction D1 to compensate for the linear retraction of the conveyor linkage assembly 16 when the lift assembly 24 is in the fully raised position. Similarly, the curved track portion 150 and the cross-member 152 may translate in the second direction D2 to compensate for the linear expansion of the conveyor linkage assembly 16 when the lift assembly 24 is in the fully lowered position. It should be appreciated that the take-up assembly 90 shown in the figures is only one non-limiting embodiment, and that other configurations may be used as well.

Figure 12:
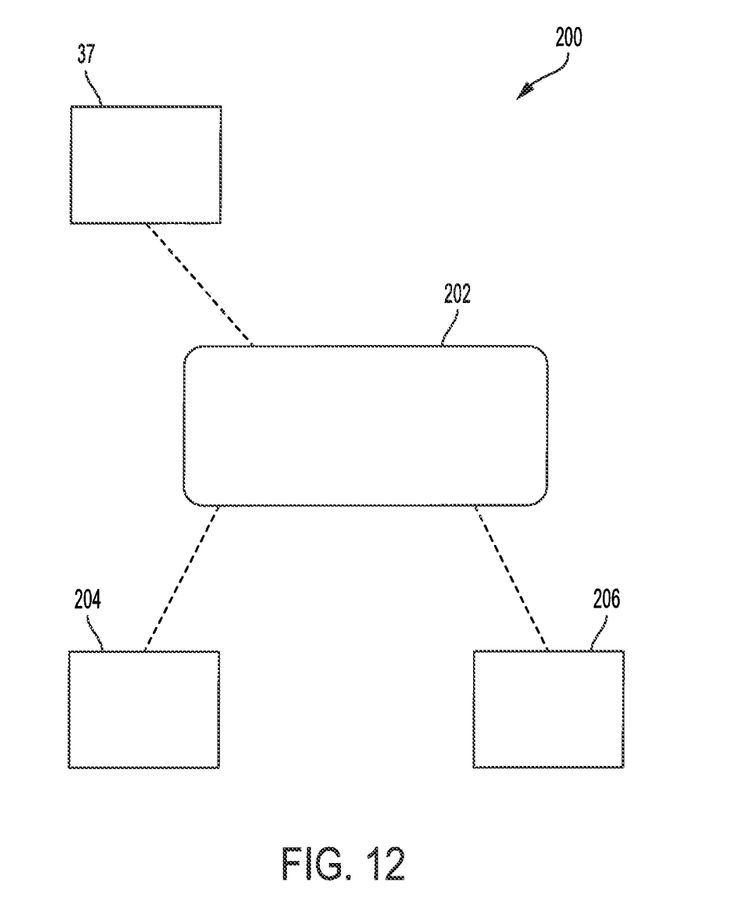
FIG. 12 is a schematic of a control system according to one or more embodiments of the present disclosure.

In accordance with the present disclosure, the conveyor system 10 may comprise an adjustment control system 200. The adjustment control system 200 may be configured to monitor the position of the telescoping joint 29 or joints of each translatable section 33 and appropriately position one or more of the take-up assemblies 90 to account for changes in conveying path 22 length. With reference to FIG. 12, the adjustment control system 200 may comprise a controller 202, a positional sensor 204, and a take-up actuator 206. The controller 202 monitors the position of the telescoping joint 29 with the positional sensor 204 and provides commands to one or more of the take-up actuators 206 to adjust in a compensating fashion to maintain consistent total length of the conveying path 22 of the conveyor system 10.

The controller 202 may comprise at least one microprocessor that executes software and/or firmware code stored in memory. The software/firmware code contains instructions that, when executed by the controller 202, causes one or more of the take-up actuators 206 to adjust in a compensating fashion to maintain consistent total length of the conveying path 22 upon adjustment of the telescoping joint 29. The controller 202 may further be connected to each of the positional sensor 204 and take-up actuator 206 with a communication pathway. The communication pathway may include any suitable wireless and/or wired communication module operative to transmit and receive data and controls over communication links.

The position of the telescoping joint 29 may be monitored with the positional sensor 204 affixed to the telescoping joint 29. Specifically, the positional sensor 204 may be configured to determine the extent of expansion or contraction of the telescoping joint 29. With reference to FIGS. 6A, 6B, 8A, and 8B, the positional sensor 204 may comprise an optical distance sensor with one component affixed to the translatable section 33 on each side of the telescoping joint 29. For example, when the telescoping joint 29 comprises the slip joint 92, one component of an optical distance sensor may be affixed to the external member 110 and the other component affixed to the telescoping member 112 to provide the quantitative value for the change in slip joint 92 extension during operation. Non-limiting examples of positional sensor 204 include photo eyes, laser proxies, laser distance measuring devices, and limit switches. It will be appreciated that additional styles of positional sensors 204 may be utilized in the adjustment control system 200 including magnetic sensors, capacitive sensors, and a series of proximity sensors.

As previously indicated, the take-up actuator 206 adjusts its respective take-up 90 in a compensating fashion to maintain consistent total length of the conveying path 22 of the conveyor system 10 upon expansion or contraction of the telescoping joint 29. A standard take-up utilized on previous conveyors utilize a passive system of air pressure and/or chain tension to adjust or maintain the length of the conveyor. However, standard take-ups utilized on previous conveyors are limited in the magnitude of path length adjustment. The take-up actuator 206 of the present disclosure actively drives the take-up 90 to provide real-time adjustment during operation of the conveyor system 10 and allows for increased path length adjustment. The take-up actuator 206 may comprise any mechanism capable of precisely and expeditiously adjusting the take-up 90. For example, the take-up actuator 206 may comprises a screw drive, oppositely positioned oil or air driven pistons, or a chain drive.

In addition to or in lieu of the positional sensor 204, the adjustment control system 200 may be in operative communication with a control system that actuates the lift 37 and positioning of the lift frame 27. Based on geometric constraints of the conveyor system 10, change in the extension of the telescoping joint 29 may be determined from the positioning of the lift frame 27 without confirmatory measurement from the positional sensor 204. As such, the adjustment control system 200 may receive notice from the control system that actuates the lift 37 and positioning of the lift frame 27 of present or future activation of the lift assembly 24 to allow for immediate or scheduled compensatory adjustment of the take-up 90.

The conveyor system 10 of the present disclosure allows for assembly of a generic process line which can vary coating or treatment processes utilized in real time. For example, the conveyor system 10 may comprise numerous product treatment baths 8 in series with the conveying path 22 and conveyor linkage assembly 16 passing over each product treatment bath 8. One or more of the product treatment baths 8 may comprise a pretreatment, one or more product treatment baths 8 may comprise an acid etching chemical, one or more product treatment baths 8 may comprise a paint, and one or more product treatment baths 8 may comprise a washing or rinsing chemical. The single conveyor system 10 may be utilized for a variety of articles 6 which undergo different treatments by adjusting the position of the lift assembly 24 over each product treatment bath 8. For example, the lift assembly 24 over the product treatment bath 8 comprising paint may be adjusted to only coat a portion of the article 6 or skip the painting process entirely as paint may be undesirable on section of the article 6 where an adhesive will subsequently be placed. Further, acid etches may be utilized for articles 6 of certain metal types, but omitted for articles 6 of other metal types.

It should now be understood that various aspects of the conveyor system are described and such aspects may be utilized in conjunction with various other aspects. In view of the foregoing the present invention relates inter alia, without being limited thereto, to the following aspects.

In a first aspect, the disclosure provides a conveyor system. The conveyor system comprises a plurality of conveyor sections defining a conveying path extending from an upstream conveyor section to a downstream conveyor section with a translatable section disposed therebetween. The translatable section includes a declined section, an inclined section, and an intermediate section between the inclined section and the declined section. The conveyor system further includes a lift assembly operationally connected to the translatable section, the lift assembly including a fully lifted position, a fully lowered position, and a plurality of intermediate positions between the fully lifted position and the fully lowered position. The conveyor system yet further includes a telescoping joint operationally connected to and positioned between two of the conveyor sections of the translatable section. The telescoping joint is configured to contract in a linear direction as the lift assembly is actuated toward the fully raised position and is configured to expand in the linear direction as the lift assembly is actuated towards the fully lowered position.

In a second aspect, the disclosure provides the conveyor system of the first aspect, in which the translatable section further includes a lead-in section in substantial alignment with the upstream section, a lead-out section in substantial alignment with the downstream section, or both the lead-in section and the lead-out section. Further, one or more of the lead-in section and the lead-out section comprise two or more subsections with the telescoping joint located therebetween; the lead-in section connects the upstream section and the declined section; and the lead-out sections connects the downstream section and the inclined section.

In a third aspect, the disclosure provides the conveyor system of the second aspect, in which the lead-in section is contiguous with the upstream section and the lead-out section is contiguous with the downstream section.

In a fourth aspect, the disclosure provides the conveyor system of any of the first through third aspects, in which the intermediate section includes two or more conveyor sections and the telescoping joint is disposed between two of the two or more conveyor sections of the intermediate section.

In a fifth aspect, the disclosure provides the conveyor system of any of the first through fourth aspects, in which the plurality of conveyor sections define an overall length of the conveying path, and wherein the overall length of the conveying path increases as the telescoping joint expands and the overall length of the conveying path decreases as the telescoping joint contracts.

In a sixth aspect, the disclosure provides the conveyor system of any of the first through fifth aspects, in which the telescoping joint comprises: an external member; and a telescoping member nested within the external member and configured to translate in the linear direction with respect to the external member.

In a seventh aspect, the disclosure provides the conveyor system of the sixth aspect, in which the external member and the telescoping member are integrally formed as part of two adjacent conveyor sections of the translatable section.

In an eighth aspect, the disclosure provides the conveyor system of the sixth or seventh aspect, in which the external member defines at least one slot and the telescoping joint includes at least one elongated member connected to the telescoping member, wherein the elongated member is shaped to translate within the at least one slot of the external member.

In a ninth aspect, the disclosure provides the conveyor system of any of the first through eighth aspects, in which the lift assembly comprises a lifting frame and a plurality of translatable support members, the translatable support members statically affixed to the translatable section and movably affixed to the lifting frame such that the translatable support members may move in coordination with the two or more of the conveyor sections of the translatable section upon operation of the telescoping joint.

In a tenth aspect, the disclosure provides the conveyor system of the ninth aspect, in which the translatable support members are slidably affixed to support beams on the lifting frame.

In an eleventh aspect, the disclosure provides the conveyor system of any of the first through tenth aspects, in which the conveyor system further comprises a plurality of load bearing assemblies coupled to the plurality of conveyor sections, wherein the plurality of load bearing assemblies are each configured to couple to an article.

In a twelfth aspect, the disclosure provides the conveyor system of the eleventh aspect, in which the conveyor system further comprises a conveyor linkage assembly coupled to the plurality of conveyor sections by the load bearing assemblies, wherein the conveyor linkage assembly is defined by a series of chain links.

In a thirteenth aspect, the disclosure provides the conveyor system of the eleventh or twelfth aspect, in which the conveyor system further comprises one or more product treatment baths, wherein as the lift assembly incrementally travels in a vertical direction into the fully lowered position, a level of submersion of the article within the product treatment bath increases.

In a fourteenth aspect, the disclosure provides the conveyor system of the thirteenth aspect, in which the conveyor system comprises a plurality of the product treatment baths, the conveyor system being operable to move an article therebetween.

In a fifteenth aspect, the disclosure provides the conveyor system of any of the first through fourteenth aspects, in which the conveyor system further comprises at least one take-up assembly positioned downstream, upstream, or both of the translatable section of the conveyor system.

In a sixteenth aspect, the disclosure provides the conveyor system of the fifteenth aspect, in which the take-up assembly includes a curved track portion having two substantially straight side frame members parallel with respect to one another and a curved member that extends in a transverse direction between the side frame members.

In a seventeenth aspect, the disclosure provides the conveyor system of the first through sixteenth aspects, in which the lift assembly comprises a ball screw mechanism to provide fine adjustment of the vertical travel of the lift assembly and maintain the intermediate section in a level orientation.

In an eighteenth aspect, the disclosure provides a conveyor system that may exhibit the features according to any one of the preceding aspects. The conveyor system of the eighteenth aspect comprises a plurality of conveyor sections defining a conveying path extending from an upstream conveyor section to a downstream conveyor section with a translatable section disposed therebetween. The translatable section includes a declined section, an inclined section, and an intermediate section between the inclined section and the declined section. The conveyor system further comprises a lift assembly operationally connected to the translatable section, the lift assembly including a fully lifted position, a fully lowered position, and a plurality of intermediate positions between the fully lifted position and the fully lowered position. The conveyor system also comprises a plurality of load bearing assemblies coupled to the plurality of conveyor sections, wherein the plurality of load bearing assemblies are each configured to couple to an article and a conveyor linkage assembly coupled to the conveyor sections by the load bearing assemblies, wherein the conveyor linkage assembly is defined by a series of chain links. The conveyor system also comprises a telescoping joint operationally connected to and positioned between two or more of the conveyor sections of the intermediate section, wherein the telescoping joint is configured to contract in a linear direction as the lift assembly is actuated into the fully raised position and is configured to expand in the linear direction as the lift assembly is actuated towards the fully lowered position. The conveyor system further comprises a plurality of product treatment baths, wherein the article is moved successively through the plurality of product treatment baths in coordination with advancements of the conveyor linkage assembly. The lift assembly comprises a lifting frame and a plurality of translatable support members, the translatable support members being statically affixed to the translatable section and movably affixed to the lifting frame such that the translatable support members may move in coordination with the two or more of the conveyor sections of the translatable section upon operation of the telescoping joint.

It is noted that terms like "preferably," "commonly," and "typically" and the like are not utilized herein to limit the scope of the claims or to imply that certain features are critical, essential, or even important to the structure or function of the claimed invention. Rather, these terms are merely intended to highlight alternative or additional features that may or may not be utilized in a particular embodiment of the present invention.

Although the invention has been described in terms of 'a' retention wheel, 'a' product treatment bath, and the like, one or more of any of these components or other recited components can be used according the present invention.

For the purposes of describing and defining the present invention it is noted that the term "system" is utilized herein to represent a combination of components and individual components, regardless of whether the components are combined with other components.

Having described the invention in detail and by reference to specific optional features thereof, it will be apparent that modifications and variations are possible without departing from the scope of the invention defined in the appended claims. More specifically, although some aspects of the present invention may be identified herein as preferred or particularly advantageous, it is contemplated that the present invention is not necessarily limited to these preferred aspects of the invention.

What is claimed is:

1. A conveyor system comprising:
   a plurality of conveyor sections defining a conveying path extending from an upstream conveyor section to a downstream conveyor section with a translatable section disposed therebetween, wherein the translatable section includes a declined section, an inclined section, and an intermediate section between the inclined section and the declined section;
   a lift assembly operationally connected to the translatable section, the lift assembly including a fully lifted position, a fully lowered position, and a plurality of intermediate positions between the fully lifted position and the fully lowered position; and
   a telescoping joint operationally connected to and positioned between two of the conveyor sections of the translatable section, wherein the telescoping joint is configured to contract in a linear direction as the lift assembly is actuated toward the fully raised position and is configured to expand in the linear direction as the lift assembly is actuated towards the fully lowered position.

2. The conveyor system of claim 1, wherein the translatable section further includes a lead-in section in substantial alignment with the upstream section, a lead-out section in substantial alignment with the downstream section, or both the lead-in section and the lead-out section, wherein,
   one or more of the lead-in section and the lead-out section comprise two or more subsections with the telescoping joint located therebetween;
   the lead-in section connects the upstream section and the declined section; and
   the lead-out section connects the downstream section and the inclined section.

3. The conveyor system of claim 2, wherein the lead-in section is contiguous with the upstream section and the lead-out section is contiguous with the downstream section.

4. The conveyor system of claim 1, wherein the intermediate section includes two or more conveyor sections and the telescoping joint is disposed between two of the two or more conveyor sections of the intermediate section.

5. The conveyor system of claim 1, wherein the plurality of conveyor sections define an overall length of the conveying path, and wherein the overall length of the conveying path increases as the telescoping joint expands and the overall length of the conveying path decreases as the telescoping joint contracts.

6. The conveyor system of claim 1, wherein the telescoping joint comprises:
   an external member; and
   a telescoping member nested within the external member and configured to translate in the linear direction with respect to the external member.

7. The conveyor system of claim 6, wherein the external member and the telescoping member are integrally formed as part of two adjacent conveyor sections of the translatable section.

8. The conveyor system of claim 6, wherein the external member defines at least one slot and the telescoping joint includes at least one elongated member connected to the telescoping member, wherein the elongated member is shaped to translate within the at least one slot of the external member.

9. The conveyor system of claim 1, wherein the lift assembly comprises a lifting frame and a plurality of translatable support members, the translatable support members are statically affixed to the translatable section and movably affixed to the lifting frame such that the translatable support members may move in coordination with the two or more of the conveyor sections of the translatable section upon operation of the telescoping joint.

10. The conveyor system of claim 9, wherein the translatable support members are slidably affixed to support beams on the lifting frame.

11. The conveyor system of claim 1, further comprising:
a plurality of load bearing assemblies coupled to the plurality of conveyor sections, wherein the plurality of load bearing assemblies are each configured to couple to an article.

12. The conveyor system of claim 11, further comprising:
a conveyor linkage assembly coupled to the plurality of conveyor sections by the load bearing assemblies, wherein the conveyor linkage assembly is defined by a series of chain links.

13. The conveyor system of claim 11, further comprising:
one or more product treatment baths, wherein as the lift assembly incrementally travels in a vertical direction into the fully lowered position, a level of submersion of the article within the product treatment bath increases.

14. The conveyor system of claim 13, comprising a plurality of the product treatment baths, the conveyor system being operable to move an article therebetween.

15. The conveyor system of claim 1, further comprising:
at least one take-up assembly positioned downstream, upstream, or both of the translatable section of the conveyor system.

16. The conveyor system of claim 15, wherein the take-up assembly includes a curved track portion having two substantially straight side frame members parallel with respect to one another and a curved member that extends in a transverse direction between the side frame members.

17. The conveyor system of claim 1, wherein the lift assembly comprises a ball screw mechanism to provide fine adjustment of the vertical travel of the lift assembly and maintain the intermediate section in a level orientation.

18. A conveyor system comprising:
a plurality of conveyor sections defining a conveying path extending from an upstream conveyor section to a downstream conveyor section with a translatable section disposed therebetween, wherein the translatable section includes a declined section, an inclined section, and an intermediate section between the inclined section and the declined section;
a lift assembly operationally connected to the translatable section, the lift assembly including a fully lifted position, a fully lowered position, and a plurality of intermediate positions between the fully lifted position and the fully lowered position;
a plurality of load bearing assemblies coupled to the plurality of conveyor sections, wherein the plurality of load bearing assemblies are each configured to couple to an article;
a conveyor linkage assembly coupled to the conveyor sections by the load bearing assemblies, wherein the conveyor linkage assembly is defined by a series of chain links;
a telescoping joint operationally connected to and positioned between two or more of the conveyor sections of the intermediate section, wherein the telescoping joint is configured to contract in a linear direction as the lift assembly is actuated into the fully raised position and is configured to expand in the linear direction as the lift assembly is actuated towards the fully lowered position; and
a plurality of product treatment baths, wherein the article is moved successively through the plurality of product treatment baths in coordination with advancements of the conveyor linkage assembly,
wherein the lift assembly comprises a lifting frame and a plurality of translatable support members, the translatable support members statically affixed to the translatable section and movably affixed to the lifting frame such that the translatable support members may move in coordination with the two or more of the conveyor sections of the translatable section upon operation of the telescoping joint.

* * * * *